Patented Mar. 8, 1938

2,110,717

UNITED STATES PATENT OFFICE 2,110,717

INHIBITING TREATMENT FOR FERRO-MANGANESE

Jesse E. Sellers, Scotia, N. Y., assignor to General Electric Company, a corporation of New York No Drawing. Application May 1, 1935,
Serial No. 19,250

6 Claims. (Cl. 148—6.5)

My invention relates to an inhibiting treatment for ferro-manganese which is of particular utility in the manufacture of welding electrodes provided with fluxes having comminuted ferro-manganese as an ingredient.

A slow reaction takes place in a flux paste containing untreated ferro-manganese and liquid sodium silicate which results in the evolution of a gas and a change in the consistency of the paste which gradually changes it from a mobile paste to a spongy mass which flows with difficulty. This change is quite similar to the raising of bread dough. The reaction proceeds much more rapidly at high temperatures with the result that on a warm summer day the flux paste may become unfit for use in the manufacture of flux coated electrodes within a few hours after the flux paste has been mixed. The reaction involved is probably that of manganese with water involving the evolution of hydrogen. This reaction is probably assisted by the strong alkalinity of the sodium silicate or other ingredients of the flux paste. This would account for the gas formed which is known to be principally hydrogen. The change in consistency of the flux paste may be due partly to the loss of water by reaction and partly to the formation of flocculent manganese compounds.

It is an object of my invention to inhibit the reaction capacity of ferro-manganese particles used in welding fluxes and similar mixtures by forming thereon an oxide coating which protects the ferro-manganese from the other ingredients of the flux during manufacturing operations without in any way interfering with the function of the ferro-manganese in the flux during welding. There are many procedures by which this oxide coating may be formed.

The reaction capacity of ferro-manganese may be inhibited or completely prevented by subjecting the ferro-manganese to the action of an oxidizing agent or to the action of an oxidizing chemical compound until a thin oxide coating is formed thereon.

The reaction capacity of powdered ferro-manganese in flux pastes can be completely inhibited by a proper heat treatment in air at temperatures not exceeding 250° C. made prior to mixing it with the other ingredients of the paste mixture. If the particles are heated at temperatures above 250° C. there is great danger that they will take fire. If the ferro-manganese is heated at from 200 to 250° C. for about 30 minutes the flux paste of which it forms a part will under ordinary conditions show no undesirable reaction with the other flux ingredients for about 16 hours. Substantially the same results may be obtained by adding water to the powdered ferro-manganese, boiling the mixture dry and thereafter heating it at about 200° C. for about 10 minutes.

The ferro-manganese may also be treated with an oxidizing chemical compound in order to inhibit its reaction capacity. If the ferro-manganese is mixed with a solution containing a water soluble dichromate of an alkali metal and enough water to moisten the mixture which is then dried at 100 to 125° C. to remove the water and screened to break up the lumps, the ferro-manganese may be incorporated in a flux paste without producing any undesirable reaction within a reasonable length of time. For example, one or two parts by weight $K_2Cr_2O_7$ or $Na_2Cr_2O_7$ per 1000 parts of ferro-manganese will give satisfactory results. A larger amount of these dichromates may be used however and the proportions specified are not critical. While the particular treatment referred to does not completely inhibit the reaction between ferro-manganese and the other constituents of the flux paste, it does retard it sufficiently to allow comparatively large batches of flux to be made up for use in electrode coating machines and thus simplifies the manufacture of flux coated electrodes.

The treatment last described can be simplified by eliminating the drying and heating operations specified. That is, the ferro-manganese may be treated with a solution containing a water soluble dichromate of an alkali metal and enough water to moisten the mixture which is then directly incorporated in the flux paste. This treatment is not as effective as the treatment where the ferro-manganese is dried at 100 to 150° C. to remove the water before adding it to the flux paste.

The above treatments with chemical compounds may also be performed with a permanganate instead of a dichromate as specified. For example the reaction capacity of ferro-manganese may be inhibited by treating it with a dilute water solution of $KMnO_4$, boiling the mixture dry and then heating the dried residue at 200° C. for about 10 minutes.

All of the above procedures involve oxidizing agents or oxidizing chemical compounds in some form and all result in coating the ferro-manganese particles with a superficial layer of oxide which prevents surface contact between the ferro-manganese particles and the other ingredients of the flux paste. It is apparent that other treatments may be resorted to for covering ferromanganese particles with an oxide coating.

Of course the above described inhibiting treatment is not limited to the treatment of ferromanganese used in the manufacture of welding fluxes for the same treatment is effective in inhibiting the reaction capacity of ferro-manganese in pastes and mixtures used or resulting from the practice of other procedures requiring the use of ferro-manganese in the presence of other constituents with which it slowly reacts at the temperatures usually encountered in manufacturing operations.

What I claim as new and desire to secure by Letters Patent of the United States, is:

1. The method of inhibiting the reaction capacity of ferro-manganese particles in a water paste of welding flux containing ingredients including ferro-manganese particles and an ingredient of strong alkalinity in the presence of which untreated ferro-manganese particles produce an evolution of gas in the paste, which method comprises the step of coating the ferro-manganese particles with superficial layers of oxide prior to mixing said particles with the other ingredients of said flux paste, said oxide coatings preventing surface contact between said ferro-manganese particles and the other ingredients of said flux paste.

2. The method of inhibiting the reaction capacity of ferro-manganese particles in a water paste of welding flux containing ingredients including ferro-manganese particles and an ingredient of strong alkalinity in the presence of which untreated ferro-manganese particles produce an evolution of gas in the paste, which method comprises the step of treating the ferro-manganese particles in a dilute water solution of a water soluble dichromate of an alkali metal.

3. The method of inhibiting the reaction capacity of ferro-manganese particles in a water paste of welding flux containing ingredients including ferro-manganese particles and an ingredient of strong alkalinity in the presence of which untreated ferro-manganese particles produce an evolution of gas in the paste, which method comprises the step of mixing ferro-manganese particles with a solution containing at least one part by weight of a water soluble alkaline dichromate per one-thousand parts of said ferro-manganese particles and enough water to moisten said particles.

4. The method of inhibiting the reaction capacity of ferro-manganese particles in a water paste of welding flux containing ingredients including ferro-manganese particles and an ingredient of strong alkalinity in the presence of which untreated ferro-manganese particles produce an evolution of gas in the paste, which method comprises the steps of mixing said ferro-manganese particles with a solution containing at least one part by weight of a water soluble alkaline dichromate per one-thousand parts of ferro-manganese particles and enough water to moisten said particles and thereafter drying said mixture at 100° to 150° C. to remove said water.

5. The method of inhibiting the reaction capacity of ferro-manganese particles in a water paste of welding flux containing ingredients including ferro-manganese particles and an ingredient of strong alkalinity in the presence of which untreated ferro-manganese particles produce an evolution of gas in the paste, which method comprises the steps of mixing said ferro-manganese particles with a solution containing at least one part by weight of a water soluble alkaline dichromate per one-thousand parts of said ferro-manganese particles and enough water to moisten said particles, thereafter drying said mixture at 100° to 150° C. to remove said water, and screening the dried mixture to break up the lumps formed during said treatment.

6. The method of inhibiting the reaction capacity of ferro-manganese particles in a water paste of welding flux containing ingredients including ferro-manganese particles and an ingredient of strong alkalinity in the presence of which untreated ferro-manganese particles produce an evolution of gas in the paste, which method comprises the steps of treating the ferro-manganese particles in a dilute solution of $KMnO_4$, boiling the resultant mixture until dry, and thereafter heating the dried mixture for about ten minutes at about 200° C.

JESSE E. SELLERS.